US006481904B2

(12) United States Patent
Fukugawa et al.

(10) Patent No.: US 6,481,904 B2
(45) Date of Patent: Nov. 19, 2002

(54) LIGHT-SHIELDING PACKAGING SYSTEM FOR PHOTOSENSITIVE WEB ROLL

(75) Inventors: Masafumi Fukugawa, Kanagawa (JP); Norihiro Kadota, Kanagawa (JP); Masahiro Enomoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 17 days.

(21) Appl. No.: 09/797,776

(22) Filed: Mar. 5, 2001

(65) Prior Publication Data

US 2001/0024575 A1 Sep. 27, 2001

(30) Foreign Application Priority Data

Mar. 3, 2000 (JP) ....................................... 2000-058685

(51) Int. Cl.[7] .......................... G03B 17/26; B65D 85/67
(52) U.S. Cl. ..................... 396/513; 242/348.4; 206/413
(58) Field of Search ................................ 396/511, 512, 396/513; 242/348, 348.4; 206/413, 414, 415, 416, 410

(56) References Cited

U.S. PATENT DOCUMENTS 2,267,126 A * 12/1941 Moretti ....................... 206/413
4,455,076 A * 6/1984 Birkeland ................... 396/512
4,733,777 A * 3/1988 Geyte et al. ................ 206/316
4,911,299 A * 3/1990 Peeters ....................... 206/410
5,049,928 A * 9/1991 Tirone ........................ 396/512
5,335,873 A * 8/1994 Harris et al. ................ 242/348
5,353,933 A * 10/1994 Takahashi et al. .......... 206/398
5,472,089 A * 12/1995 Specogna et al. ........... 206/413
5,941,387 A * 8/1999 Rasel ......................... 206/413
6,045,087 A * 4/2000 Vislocky et al. ......... 242/608.6
6,095,330 A * 8/2000 Essert et al. ................ 206/410

FOREIGN PATENT DOCUMENTS

EP 0 681 212 A1 * 11/1995

* cited by examiner

*Primary Examiner*—Alan A. Mathews
(74) *Attorney, Agent, or Firm*—Sughrue Mion, PLLC

(57) ABSTRACT

A light-shielding packaging for a roll of continuous photosensitive web includes a tubular core having on each end a light-shielding flange disc; and a roll of a continuous photosensitive web wound on the core, which has a diameter identical to a diameter of the flange disc. The photosensitive web has at its leading end a light-shielding leader sheet which has a length larger than circumferential length of the flange disc and a width larger than a width of the photosensitive web, whereby each side portion of the leader sheet extends beyond the periphery of the flange disc to reach the outer surface of the flange disc. An adapter of rigid resin is provided which includes a hollow cylinder member having at its one end a flange member and which is attached to the core by inserting the cylinder member into the tubular core.

12 Claims, 9 Drawing Sheets

LIGHT-SHIELDING PACKAGING SYSTEM FOR PHOTOSENSITIVE WEB ROLL

FIELD OF THE INVENTION

The present invention relates to a light-shielding packaging system favorably employable for roomlight loading of a roll of a continuous photosensitive web into a process camera.

BACKGROUND OF THE INVENTION

In the process camera, a roll of a continuous photosensitive web wound on a tubular core is withdrawn for exposure using a rotational supporting rod which is provided in the camera. The supporting rod is inserted into the inner space of the tubular core, so that the rod can support the photosensitive web roll. The supporting rod also serves to drive the web roll to rotate for withdrawing or rewinding the web roll. For the roomlight loading, the roll of continuous photosensitive web should be placed in a light-shielding packaging.

European Patent Application No. 0 181 417 A1 (issued on May 21, 1986) discloses a light-shielding packaging of rolls of light-sensitive material such as strip of photographic film or paper, for roomlight loading. The packaging comprises opaque material which protects the rolled material from light while leaving a leader of the rolled material exposed and which can be torn by pulling on such leader to cause the light-sensitive material to commence unwinding from the roll. A piece of heat-shrinkable sheet material is used together to cover the leader as well as a portion of the light-sensitive material.

U.S. Pat. No. 4,733,777 (issued on Mar. 29, 1988) and European Patent Specification 0 230 057 B1 (issued on May 16, 1990) both disclose a light-tightly packaged roll of light-sensitive material, which comprises an annular end cover for each end face of the roll and a circumferential cover wound around the periphery of the roll and having lateral extensions sealed with their inner surface to the inner surface of radially outwardly projecting margins of the end covers.

U.S. Pat. No. 4,911,299 (issued on Mar. 27, 1990) discloses a strip of light sensitive material wound in a coil onto an open-ended core which is packaged in tearable light tight wrapping material protecting the rolled web while leaving an exterior end of the coil exteriorly accessible. The light tight wrapping material is tearable by pulling on the exterior end to commence unwinding of the coil from the core.

European Patent Application 0 681 212 A1 (issued on Nov. 8, 1995) and U.S. Pat. No. 5,472,089 (issued on Dec. 5, 1995) both disclose a light-tight packaging for photosensitive web roll having a flexible leader portion that overlaps the outermost first convolution of the roll. The leader has three stretchable segments which can cooperate with light-shielding flange portions to form light-tight labyrinth-type sealing.

Another photosensitive web roll supporting system in which a light-shielding adapter is used for supporting and rotating the web roll is also known. The light-shielding adapter comprises a hollow cylinder member having at one end thereof a light-shielding flange member. The light-shielding adapter is fixed to the core of the photosensitive web roll by inserting the cylinder member into the tubular core. The light-shielding flange member is simultaneously brought into contact with a side surface of the web roll so as to light-tightly seal the photosensitive web roll.

SUMMARY OF THE INVENTION

The present invention has an object to provide a new light-shielding packaging system for a roll of continuous photosensitive web wound on a core.

Specifically, the invention has an object to provide a light-shielding packaging system for a roll of continuous photosensitive web wound on a core which is utilizable in various process cameras equipped with different systems for supporting and rotating a photosensitive web roll.

The present invention resides in a light-shielding packaging of a photosensitive web roll comprising:

a tubular core having on each end thereof a light-shielding flange disc;

a roll of a continuous photosensitive web wound on the tubular core, which has a diameter essentially identical to a diameter of the flange disc, the photosensitive web having at a leading end thereof a light-shielding leader sheet which has a length larger than circumferential length of the flange disc and a width larger than a width of the photosensitive web, whereby each side portion of the leader sheet extends beyond the periphery of the flange disc to reach the outer surface of the flange disc; and an adapter of rigid resin which comprises a hollow cylinder member having at one end thereof a flange member and which is detachably attached to the core by inserting the cylinder member into the tubular core.

In the light-shielding packaging of the invention, the flange member of the adapter preferably has a diameter larger than the diameter of the roll of continuous photosensitive web. The hollow cylinder of the adapter preferably has a tapered free end.

The side portion of the light-shielding leader sheet extends beyond the periphery of the flange disc and preferably is fixed onto the outer surface of the flange disc by fusion thereof.

The light-shielding flange disc preferably comprises a hollow cylinder having a light-shielding ring member at one end thereof or is composed of a combination of a light-shielding disc element and a hollow cylinder having at one end thereof a ring member having a diameter less than a diameter of the light-shielding disc.

In the light-shielding packaging of the invention, the hollow cylinder of the adapter preferably has on an inner surface thereof at least two grooves aligned in a direction perpendicularly to a plane of the ring member and the hollow cylinder member of the adapter preferably has on an outer surface thereof at least two linear protrusions aligned in a direction perpendicularly to a plane of the flange member so that each linear protrusion is brought into contact with each groove. Further, the hollow cylinder member of the adapter preferably has at least two slits which are placed between the linear protrusions.

DETAILED DESCRIPTION OF THE INVENTION

Figure 1:
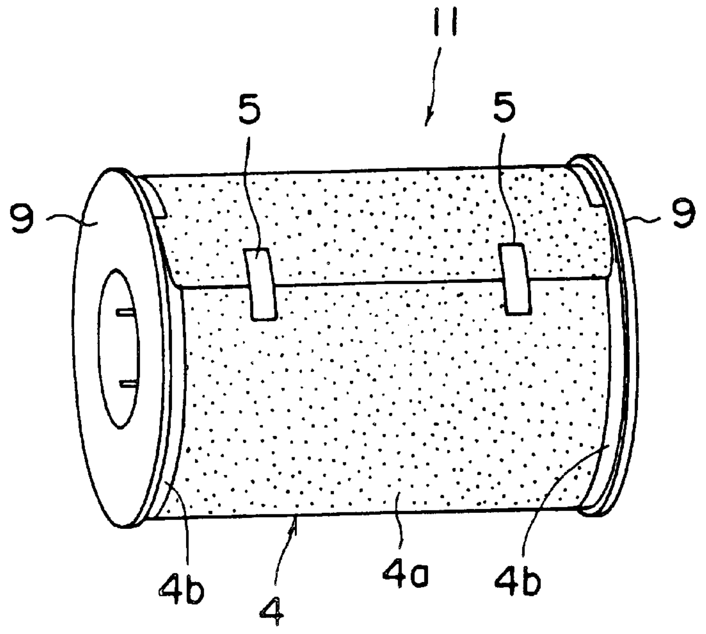
FIG. 1 illustrates a light-shielding packaging of a continuous photosensitive web roll according to the invention.
Figure 2:
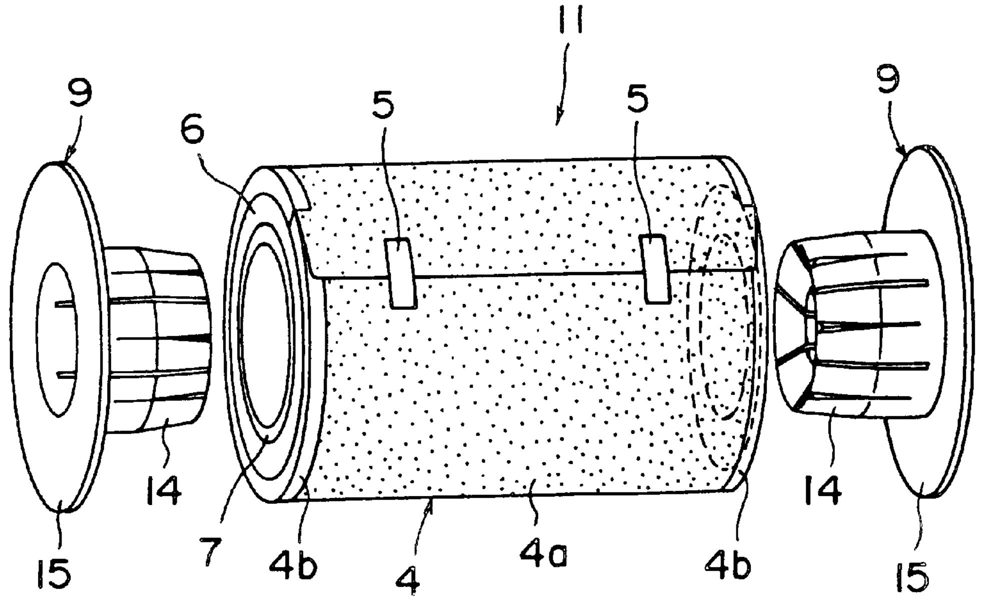
FIG. 2 illustrates a light-shielding packaging of a continuous photosensitive web roll of FIG. 1, in which an adapter is detached.
Figure 3:
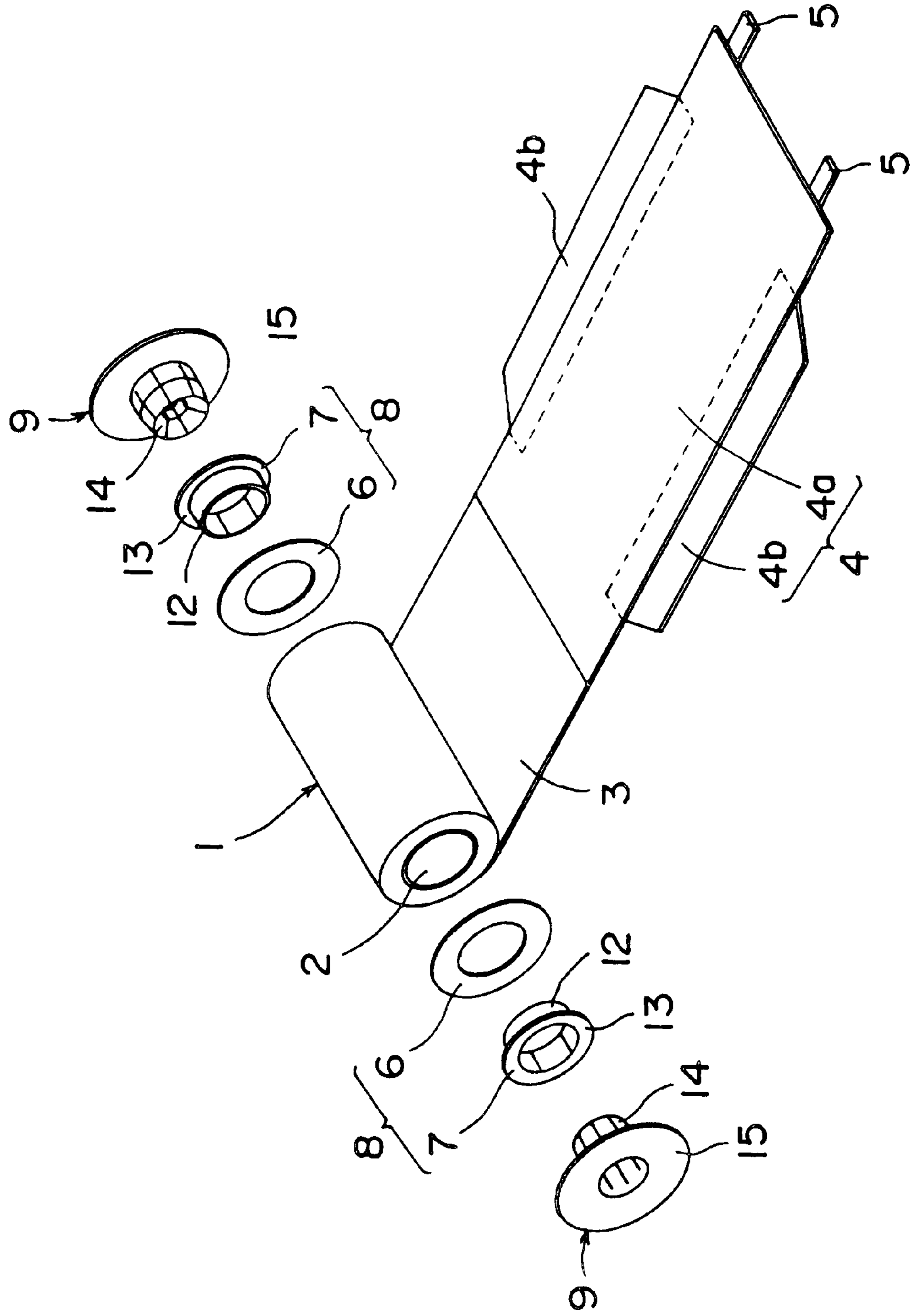
FIG. 3 illustrates a light-shielding packaging of a continuous photosensitive web roll of FIG. 1, in which most of the constitutional elements are separated.

A representative structure of the light-shielding packaging of a photosensitive web roll according to the invention is described by referring to FIGS. 1 to 3 illustrated in the attached drawings.

The light-shielding packaging of a photosensitive web roll comprises:

- a tubular core 2 which has on each end thereof a light-shielding flange disc 8; and
- a roll 1 of a continuous photosensitive web 3 which is wound on the tubular core 2 and which has a diameter essentially identical to a diameter of the flange disc 8.

The photosensitive web 3 has at a leading end thereof a light-shielding leader sheet 4 which has a length larger than circumferential length of the flange disc 8 and a width larger than a width of the photosensitive web 3, whereby each side portion of the leader sheet 4 extends beyond the periphery of the flange disc 8 to reach the outer surface of the flange disc 8.

To the core 2 is attached an adapter 9 of rigid resin which is composed of a hollow cylinder member 14 having at one end thereof a flange member 15. The adapter 9 is detachably attached to the core 2 by inserting the cylinder member 14 into the tubular core 2. In other words, the adapter 9 can be inserted into the core 2 and separated from the core 2, repeatedly, if desired. The hollow space of the hollow cylinder member 14 or the periphery of the flange member 15 of the adapter may be utilized in combination with the supporting rod or roller of the camera to drive the web roll to rotate for withdrawing or rewinding the web roll. In the case were the adapter 9 is removed from the core 2, the inner space of the core can be utilized in combination with the supporting rod of another type to drive the photosensitive web roll 1 to rotate for withdrawing or rewinding the web roll 1.

The tubular core 2 is generally made of paper board, fiber board, or similar material.

The light-shielding flange 6 has a diameter which is essentially equal to the diameter of the web roll 1, and is generally made of light-shielding flexible sheet. The light-shielding flange 6 preferably has a thickness of 0.1 to 0.5 mm and is preferably made of polymer material containing 1 to 10 wt. % of carbon black. The polymer material can be polycarbonate, polystyrene (particularly, high-impact polystyrene), polyester, or polypropylene.

The light-shielding flange disc can be composed of a hollow cylinder having a light-shielding ring member at one end thereof. The hollow cylinder is inserted into the inner space of the tubular (or hollow) core. However, the light-shielding flange disc preferably is composed of a combination of a light-shielding disc element 6 and a supporting means 7 which comprises a hollow cylinder 12 having at one end thereof a ring member 13 which has a diameter less than a diameter of the light-shielding disc 6, as is seen in FIGS. 2 and 3.

The hollow cylinder of the light-shielding flange disc generally has an outer diameter which is essentially equal to the diameter of the inner space of the core. The hollow cylinder preferably has a diameter larger than the diameter of the inner space of the core by approximately 0.2 to 1.0%. The hollow cylinder preferably has a thickness of 0.2 to 1 mm, and preferably has light-shielding property. The light-shielding property can be given using polymer material containing carbon black.

The light-shielding leader sheet 4 attached to the front end of the photosensitive web 3 is preferably composed of a light-shielding film 4*a* which shows almost no heat-shrinkability and has width essentially equivalent to the width of the photosensitive web 3 and a pair of heat-shrinkable light-shielding strips 4*b* which are attached on both side portions of the light-shielding film 4*a*. The light-shielding strip 4*b* has a length equal to or more than (preferably as much as approximately two times or more) the length of the periphery of the flange disc 6. The light-shielding strip 4*b* is fixed to the light-shielding film 4*a* preferably on such surface that does not face the preceding convolution of the photosensitive web roll 1.

The light-shielding film 4*a* can be made of a low-density polyethylene film containing pigment such as carbon black.

The heat-shrinkable light-shielding strips 4*b* preferably show a heat shrinkage ratio in its longitudinal direction which is higher than that in the width direction. For instance, the heat shrinkage ratio (measured at 100° C.) in the longitudinal direction generally is 5% or more, preferably 15% or more. The heat shrinkage ratio in the width direction generally is less than the above-mentioned heat shrinkage ratio by 1% or more (difference of the ratio), preferably 3% or more, more preferably 5% or more. The heat shrinkage ratio is determined according to JIS (Japanese Industrial Standard) Z 1709–1976 (defined for heat-shrinkable package film).

The heat-shrinkable light-shielding strip 4*b* preferably is tearable in the longitudinal direction and preferably has an Ermendorf tearing weight of 0.1 to 0.5N in the longitudinal direction. The Ermendorf tearing weight is determined according to JIS K 7128-2:1998 (for Test for tearing strength of plastic film or film, Part 2).

The heat-shrinkable light-shielding strip can be composed of a heat-shrinkable transparent or opaque film which is laminated on a light-shielding film having essentially no heat shrinkability. Commercially available examples of the heat-shrinkable transparent or opaque films for employably preparing the heat-shrinkable light-shielding strip include FANCY WRAP-THS, -TNS, -TAS, -TBS, and -TRS, all of which are available from Gunze Co., Ltd. The almost non-shrinkable light-shielding film can be a low density polyethylene film containing pigment such as carbon black.

The heat-shrinkable light-shielding strips 4*b* extend beyond the periphery of the flange disc 8, particularly the ring member 6, to reach the outer surface of the flange disc 8, particularly the ring member 6, as is seen in FIG. 2.

The light-shielding leader sheet 4 can be attached to the photosensitive web 3 by any means such as an adhesive tape. The attachment can be made by fusing or melting the corresponding end of the leader sheet and/or web.

The leader sheet 4 can be temporarily fixed onto the photosensitive web 3 of the preceding convolution by adhesive tapes 5.

The adapter 9 is made of rigid resin (e.g., high-impact polystyrene or polycarbonate) and which comprises a hollow cylinder member 14 having at one end thereof a flange member 15 in the form of a ring. The flange member 15 has a thickness in the range of 2 to 4 mm.

The light-shielding packaging 11 of photosensitive web roll can be produced, for instance, by the following procedures.

(1) Each of the light-shielding flange discs is attached to each end of the core of the photosensitive web roll.

(2) The light-shielding leader sheet is wound around the web roll, and hot air is applied onto the side portions of the leader sheet. The side portions shrink on the outer surfaces of the flange discs and are attached onto the outer surfaces.

(3) The front end of the leader sheet is fixed on the preceding convolution of the web roll using adhesive tapes.

(4) A heating head of a ring heater is pressed to the shrunken side portions of the leader sheet attached onto the outer surfaces of the flange disc so that the side portions are fused onto the outer surfaces.

Figure 4:
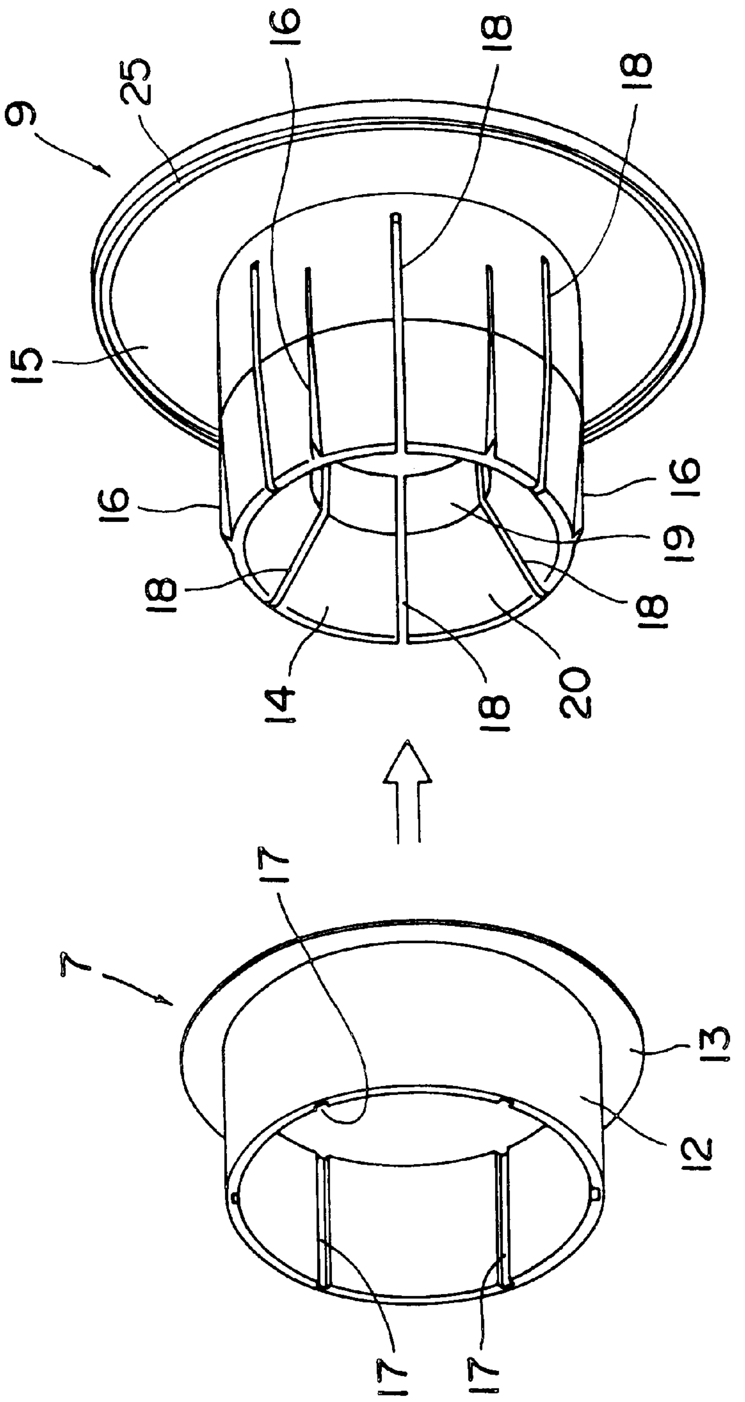
FIG. 4 illustrates a combination of an adapter and a light-shielding flange disc.
Figure 5:
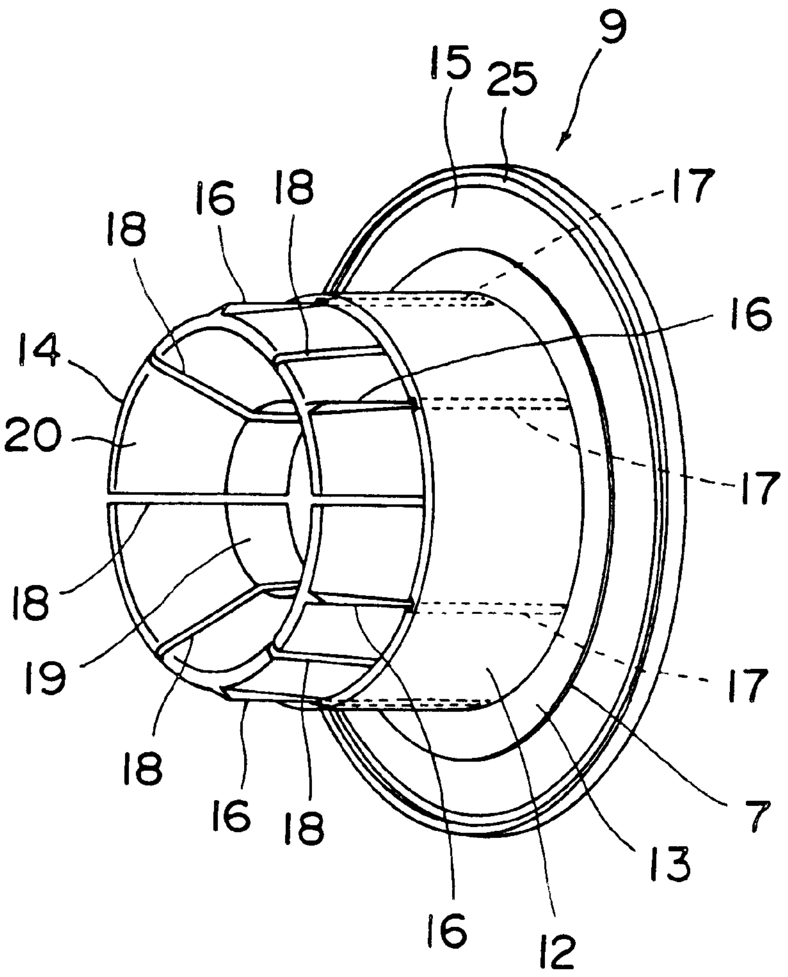
FIG. 5 illustrates an adapter of different type.
Figure 6:
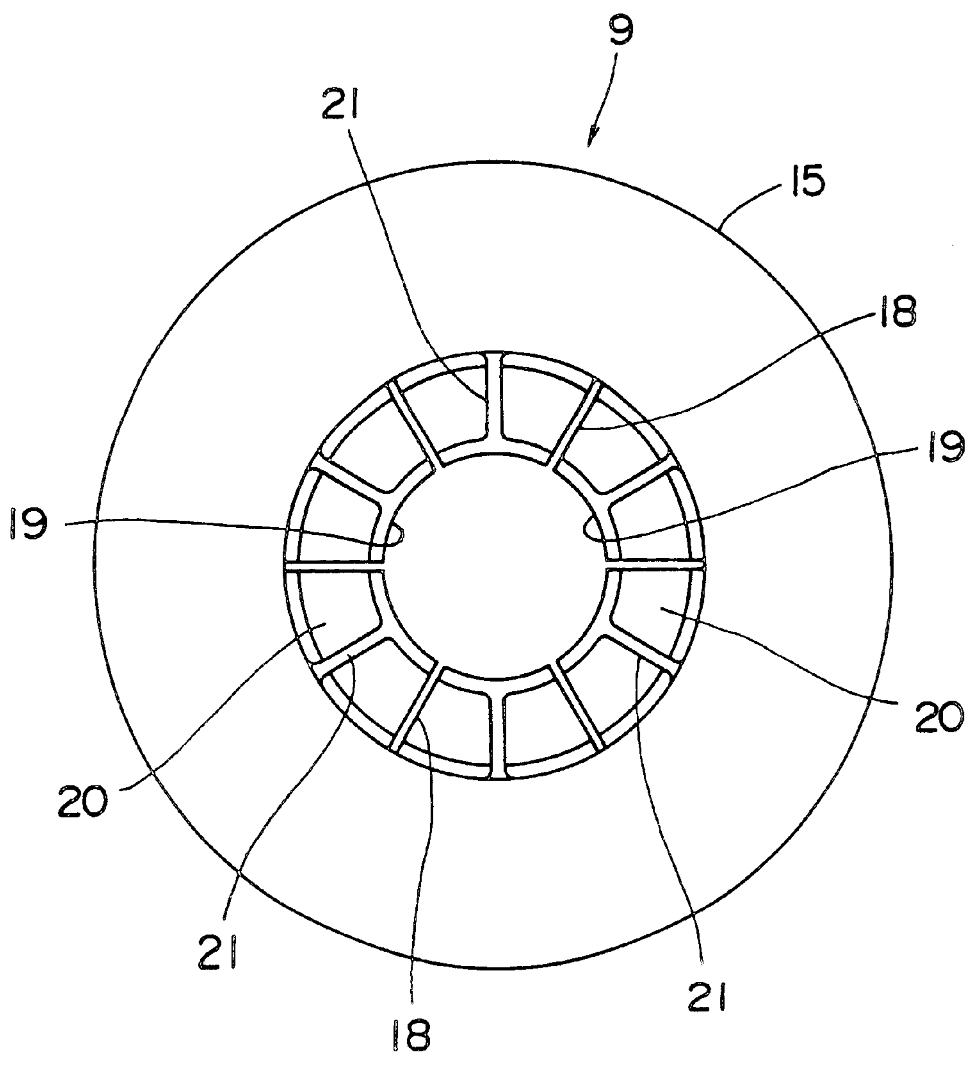
FIG. 6 illustrates an adapter seen from a side of the flange member.

The flange discs and the adapter attached to the continuous photosensitive web roll of the invention are described below in more detail, by referring to FIGS. 4 through 6. FIG. 4 schematically illustrates a set of a flange disc 7 and an adapter 9, which are seen in FIGS. 1 through 3. FIG. 5 illustrates a combined structure of the flange disc 7 and adapter of FIG. 4. FIG. 6 illustrates the adapter of FIG. 4 seen from its backside (i.e., the side on which no cylinder member is provided).

On the outer surface of the cylinder member 14 of the adapter 9, six linear protrusions 16 are arranged in the longitudinal direction in parallel and with an equivalent space. On the inner surface of the hollow cylinder 12 of the flange disc 7, six grooves 17 are so provided as to receive the six linear protrusions 16 when the hollow cylinder 12 is inserted into the cylinder member 14 of the adapter 9. Thus, the hollow cylinder 12 is firmly engaged with the cylinder member 14, so as to keep the flange disc 7 from skidding, when the adapter 9 is rotated.

The cylinder member 14 of the adapter 9 has a length larger than that of the hollow cylinder 12 of the flange disc 7, so that the front end of the cylinder member 14 is not covered with the hollow cylinder 12, as is seen from FIG. 6. The exposed front end of the cylinder member 14 can serve to facilitate detachment of the cylinder member 14 from the hollow cylinder 12. Moreover, if the cylinder member 14 has equivalently produced slits 18 in each area 20 between the adjoining linear protrusions 16, as is illustrated in FIGS. 4 and 5, it becomes more easy to detach the cylinder member 14 from the hollow cylinder 12 by squeezing the exposed front end of the cylinder member 14.

The front end of the cylinder member 14 is preferably bent inwardly and then has an inner cylindrical portion 19 which receives therein a connecting rod provided to a camera. As is seen in FIG. 6, the cylindrical portion 19 can be supported by plural ribs 21 for strengthening the mechanical structure of the cylindrical portion 19, particularly, required in the rotation of the web roll by means of the connecting rod.

Adjacent to the periphery of the flange member 15 of the adapter 9, a circular groove 25 is preferably produced. Details of the circular groove are described hereinafter.

Figure 7:
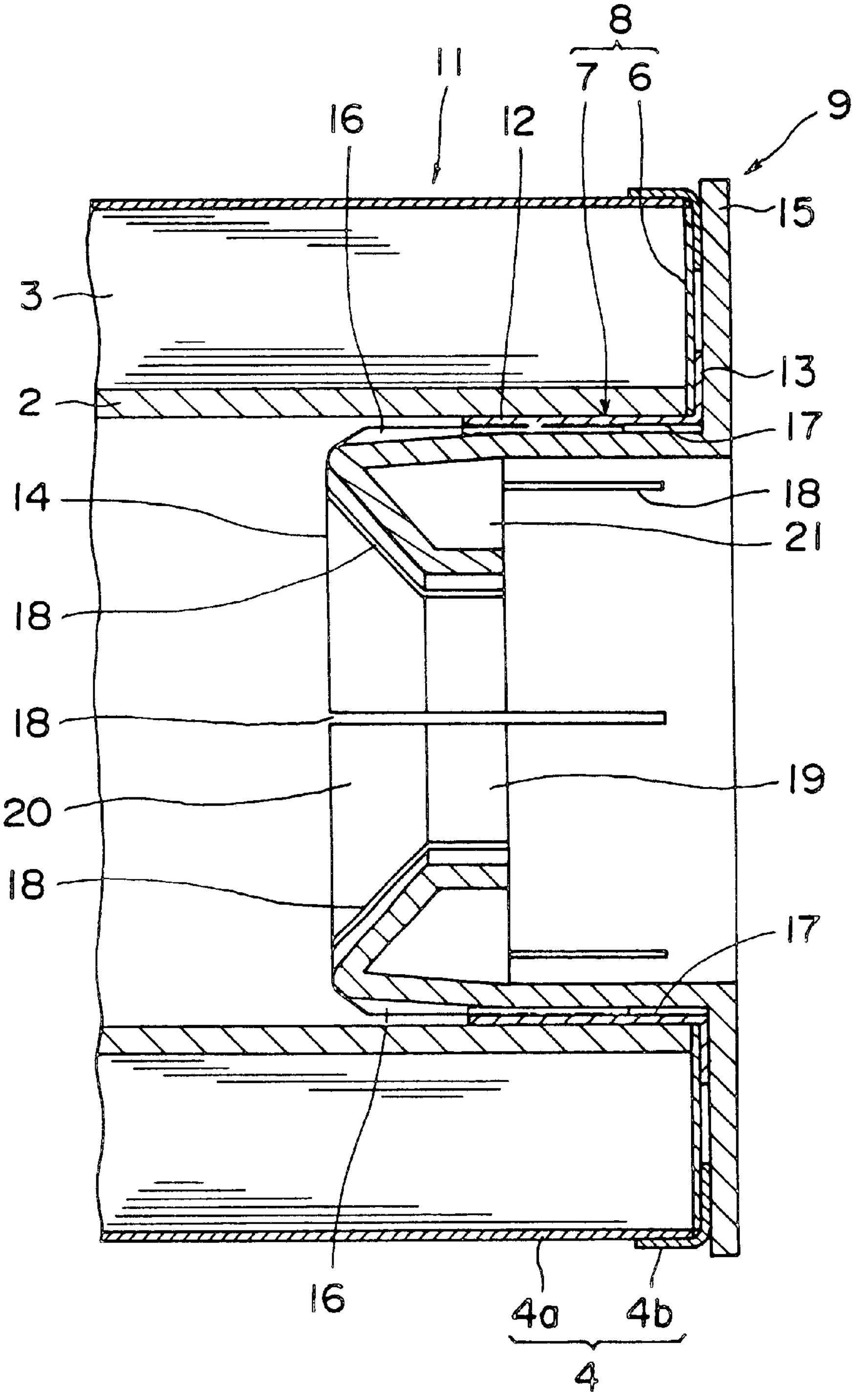
FIG. 7 is a partial section of a light-shielding packaging of FIG. 1.

FIG. 7 is a sectional view of a structure of FIG. 1 in which the light-shielding flange disc 8 (composed of the light-shielding disc element 6 and the hollow cylinder 7 having the ring member 13 on one end) and the adapter 9 are attached to the core 2 of the photosensitive web roll 11.

Typical data of the dimensions of the light-shielded photosensitive web roll package of the invention are given below:

| | |
|---|---|
| Outer diameter of web roll 11: | 112 mm |
| Inner diameter of core 2: | 73.7 mm |
| Thickness of wall of core 2: | 2 mm |
| Outer diameter of disc element 6: | 112 mm |
| Diameter of circular opening of disc element 6: | 74.2 mm |
| Length of hollow cylinder 7: | 30 mm |
| Inner diameter of hollow cylinder 7: | 72.5 mm |
| Diameter of ring member 13: | 90 mm |
| Length of cylinder member 14: | 50 mm |
| Outer diameter of cylinder member 14: | 72 mm |
| Diameter of flange member 15: | 131 mm |

Figure 8:
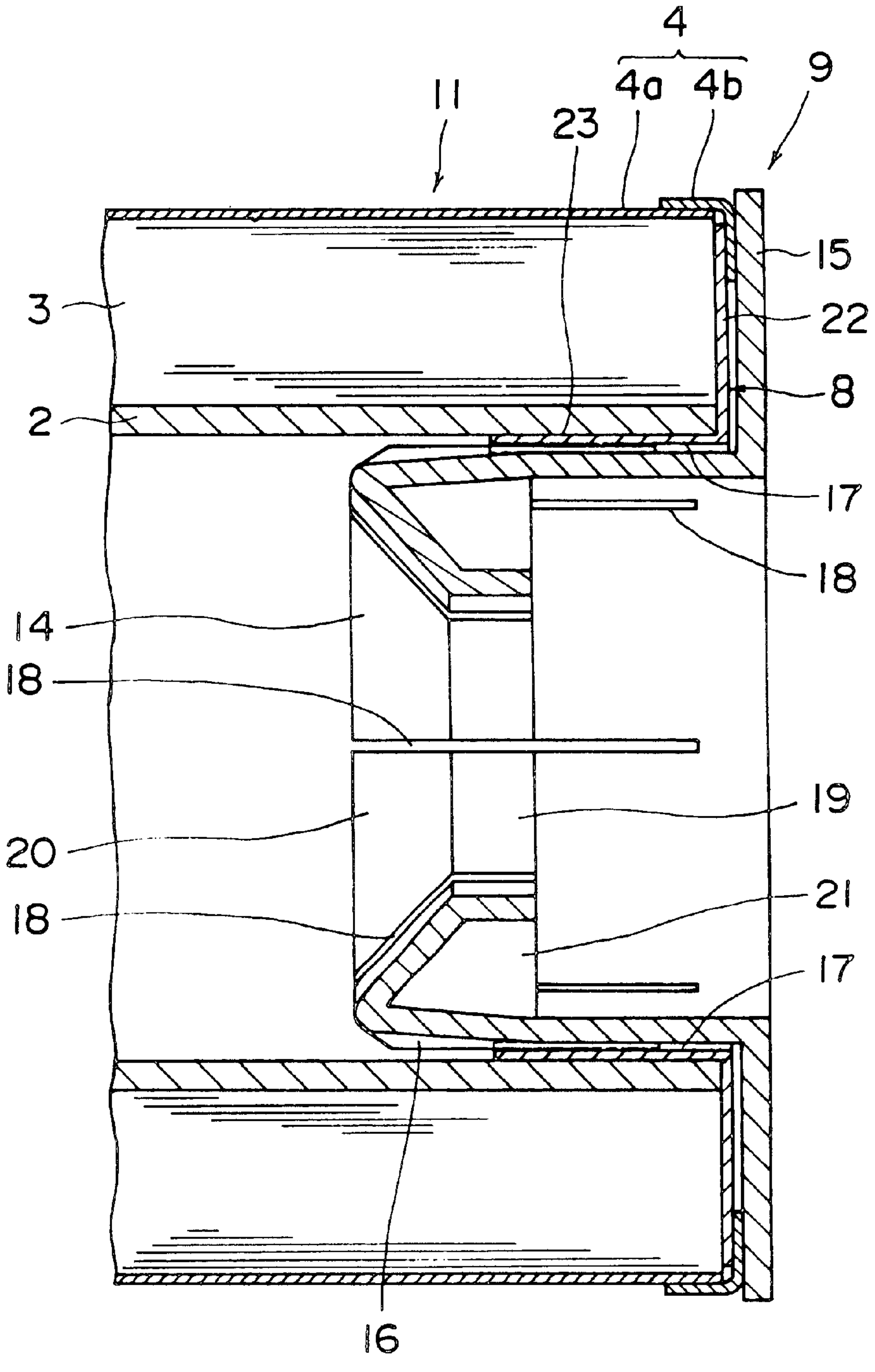
FIG. 8 is a partial section of another example of the light-shielding packaging according to the invention.

FIG. 8 is a sectional view of another structure of a light-shielded photosensitive web roll package according to the invention in which the light-shielding flange disc 8 composed of the hollow cylinder 17 having the ring member 22 on one end and the adapter 9 are attached to the core 2 of the photosensitive web roll 11. The structures of other portions of the light-shielded web roll package of FIG. 8 are essentially the same as those of FIG. 7.

Figure 9:
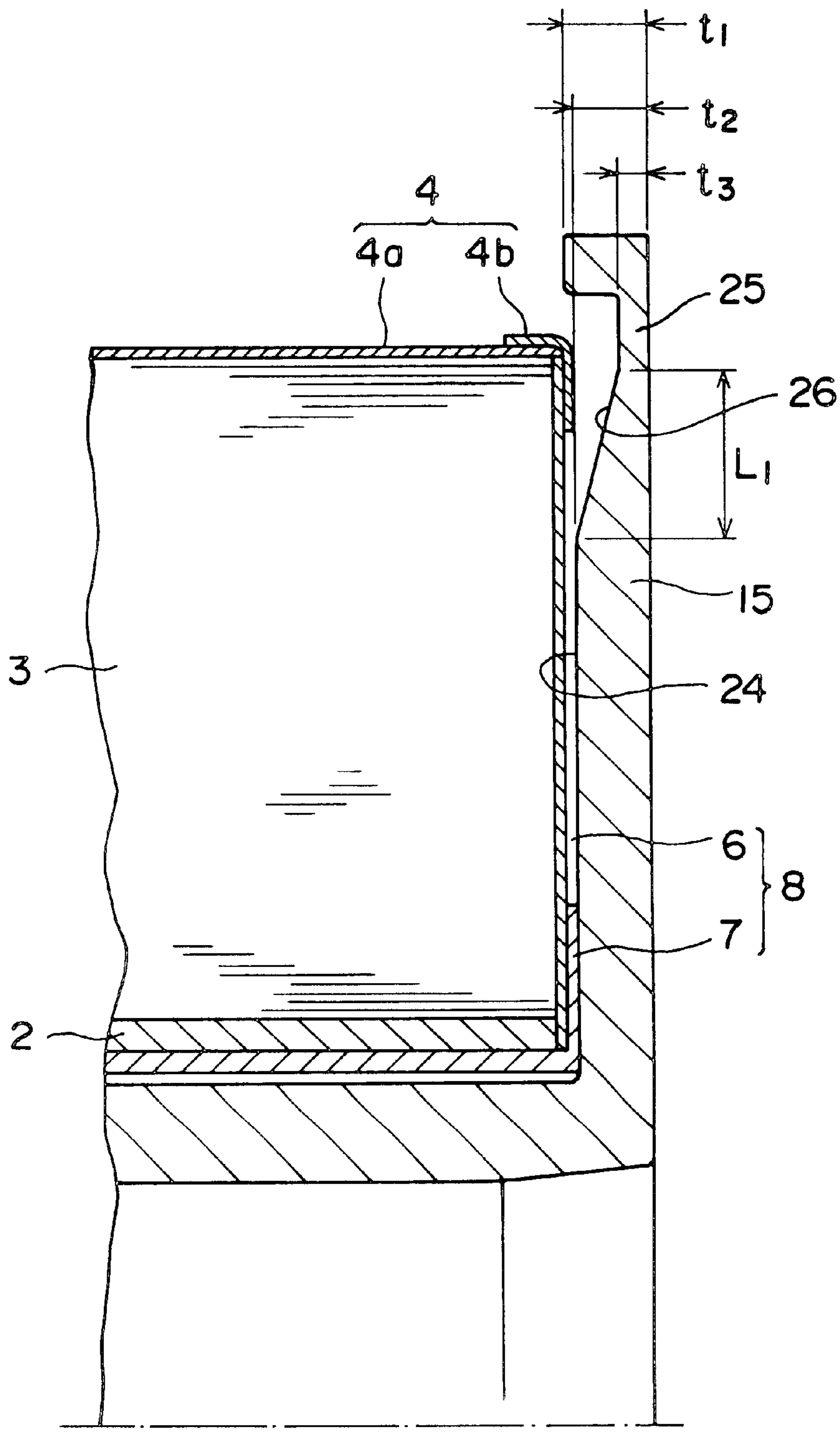
FIG. 9 is a partial section of a different example of the light-shielding packaging according to the invention.

FIG. 9 illustrates a light-shielded web roll package in which the adapter 9 of FIG. 4 having a flange member 15 which has a circular groove 25 in a position adjacent to its periphery is attached core 2.

Within a camera of certain type, the continuous photosensitive web roll is withdrawn for exposure and then rewound around the core in which the web roll was wound. In the course of rewinding the exposed photosensitive web around the core, it has been noted that one side portion of the web sometimes rubs against the inner surface of the flange disc 15 particularly when most of the continuous web is rewound around the core. If the side portion of the web runs in contact with the inner surface of the flange disc 15, the resulting web roll is apt to have a deformed structure. The deformation of the web roll structure can be effectively obviated by providing the circular groove 25 on the inner surface of the flange disc 15. The circular groove 25 may be formed on the inner surface of the flange disc 15 together with a circular shallow area 24 and a tapered area 26, as is seen in FIG. 9. Typical dimensions of the circular groove and its related areas are set forth below:

| | |
|---|---|
| Thickness of flange disc 15 ($t_1$): | 2.8–3.5 mm |
| Thickness of flange disc 15 in the shallow area ($t_2$): | 2.4–2.6 mm |
| Thickness of flange disc 15 in the groove area ($t_3$): | 0.9–1.6 mm |
| Length of tapered area 26: | adjusted to give the taper to have an angle of 10 to 30°. |

Figure 10:
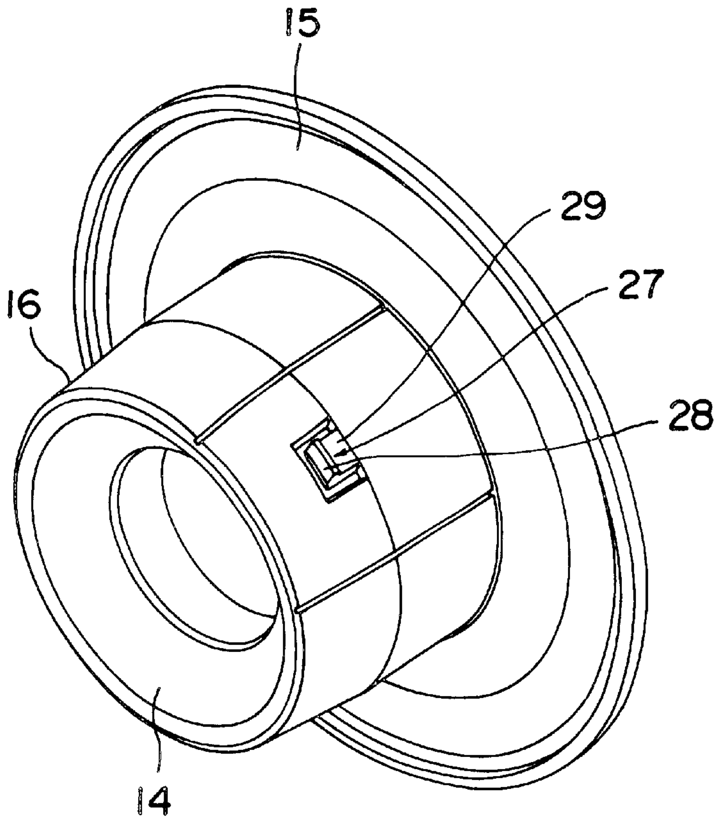
FIG. 10 illustrates an adapter of different type which has an improved engagement system.
Figure 11:
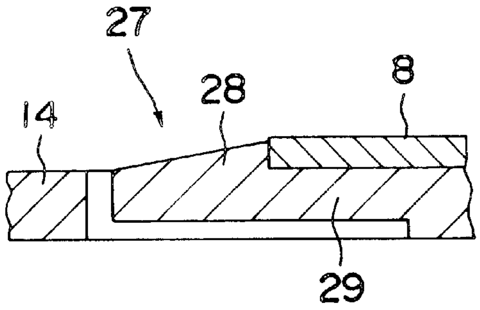
FIG. 11 illustrates the engagement of the adapter of FIG. 10 and a light-shielding flange disc.

FIG. 10 schematically illustrates an adapter 15 having a cylinder member 14 on which an improved engagement system 27 is provided. The engagement system 27 is composed of a claw 28 and a deformable claw support 29. The claw 28 is engaged with the front end of the hollow cylinder 12 of the flange disc 8, as is illustrated in FIG. 11.

What is claimed is:

1. A light-shielding packaging of photosensitive web roll comprising:

a tubular core having on each end thereof a light-shielding flange disc;

a roll of a continuous photosensitive web wound on the tubular core, which has a diameter essentially identical to a diameter of the flange disc, the photosensitive web having at a leading end thereof a light-shielding leader sheet which has a length larger than circumferential length of the flange disc and a width larger than a width of the photosensitive web, whereby each side portion of the leader sheet extends beyond a periphery of the flange disc to reach an outer surface of the flange disc;

and an adapter of rigid resin which comprises a hollow cylinder member having at one end thereof a flange member and which is detachably attached to the core by inserting the cylinder member into the tubular core.

2. The light-shielding packaging of claim 1, wherein the flange member of the adapter has a diameter larger than the diameter of the roll of continuous photosensitive web.

3. The light-shielding packaging of claim 1, wherein the hollow cylinder of the adapter has a tapered free end.

4. The light-shielding packaging of claim 1, wherein the side portion of the light-shielding leader sheet extends beyond the periphery of the flange disc and is fixed onto the outer surface of the flange disc by fusion thereof.

5. The light-shielding packaging of claim 1, wherein the adapter is made of light-shielding material.

6. The light-shielding packaging of claim 1, wherein the light-shielding flange disc comprises a hollow cylinder having a light-shielding ring member at one end thereof.

7. The light-shielding packaging of claim 1, wherein the light-shielding flange disc is composed of a combination of a light-shielding disc element and a hollow cylinder having at one end thereof a ring member having a diameter less than a diameter of the light-shielding disc.

8. The light-shielding packaging of claim 6, wherein the hollow cylinder of the adapter has on an inner surface thereof at least two grooves aligned in a direction perpendicularly to a plane of the ring member and the hollow cylinder member of the adapter has on an outer surface thereof at least two linear protrusions aligned in a direction perpendicularly to a plane of the flange member so that each linear protrusion is brought into contact with each groove.

9. The light-shielding packaging of claim 7, wherein the hollow cylinder of the adapter has on an inner surface thereof at least two grooves aligned in a direction perpendicularly to a plane of the ring member and the hollow cylinder member of the adapter has on an outer surface thereof at least two linear protrusions aligned in a direction perpendicularly to a plane of the flange member so that each linear protrusion is brought into contact with each groove.

10. The light-shielding packaging of claim 6, wherein the hollow cylinder member of the adapter has at least two slits which are placed between the linear protrusions.

11. The light-shielding packaging of claim 7, wherein the hollow cylinder member of the adapter has at least two slits which are placed between the linear protrusions.

12. A method of supporting and rotating in process cameras a light-shielding packaging comprising a tubular core having on each end thereof a light-shielding flange disc; a roll of a continuous photosensitive web wound on the tubular core, which has a diameter essentially identical to a diameter of the flange disc, the photosensitive web having at a leading end thereof a light-shielding leader sheet which has a length larger than circumferential length of the flange disc and a width larger than a width of the photosensitive web, whereby a side portion of the leader sheet extends beyond a periphery of the flange disc to reach an outer surface of the flange disc; and an adapter of rigid resin which comprises a hollow cylinder member having at one end thereof a flange member and which is detachably attached to the core by inserting the cylinder member into the tubular core, after detaching the adaptor.

* * * * *